United States Patent
Cariou et al.

(10) Patent No.: US 11,234,174 B2
(45) Date of Patent: Jan. 25, 2022

(54) ZERO LATENCY BSS TRANSITION WITH ON-CHANNEL TUNNELING (OCT)

(71) Applicant: Intel Corporation, Santa Clara, CA (US)

(72) Inventors: Laurent Cariou, Portland, OR (US); Carlos Cordeiro, Portland, OR (US); Daniel F. Bravo, Hillsboro, OR (US); Ehud Reshef, Kiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 77 days.

(21) Appl. No.: 16/728,344

(22) Filed: Dec. 27, 2019

(65) Prior Publication Data
US 2020/0137651 A1 Apr. 30, 2020

(51) Int. Cl.
*H04W 36/08* (2009.01)
*H04W 36/00* (2009.01)
*H04W 84/12* (2009.01)

(52) U.S. Cl.
CPC ....... *H04W 36/08* (2013.01); *H04W 36/0016* (2013.01); *H04W 36/0038* (2013.01); *H04W 36/0061* (2013.01); *H04W 84/12* (2013.01)

(58) Field of Classification Search
CPC ......... H04W 36/0016; H04W 36/0038; H04W 36/0055; H04W 36/0061; H04W 36/08; H04W 84/12; H04W 92/20
See application file for complete search history.

(56) References Cited

U.S. PATENT DOCUMENTS

| | | | |
|---|---|---|---|
| 2016/0044711 A1* | 2/2016 | Lou | H04W 72/1284 370/338 |
| 2019/0098565 A1* | 3/2019 | Cherian | H04W 48/18 |
| 2019/0373439 A1* | 12/2019 | Abouelseoud | H04W 76/14 |
| 2020/0280909 A1* | 9/2020 | Gan | H04W 48/16 |

OTHER PUBLICATIONS

EEE P802.11-REVmcTM/D5.0, Jan. 2016 Draft Standard for Information technology—Specific requirements Part 11: Wireless LAN Medium Access Control (MAC) and Physical Layer (PHY) Specifications, 802.11 Working Group of the LAN/MAN Standards Committee of the IEEE Computer Society (Year: 2016).*

* cited by examiner

*Primary Examiner* — Chi H Pham
*Assistant Examiner* — Vladislav Y Agureyev
(74) *Attorney, Agent, or Firm* — Schwegman Lundberg & Woessner, P.A.

(57) ABSTRACT

Embodiments of transitioning between BSSs using on-channel tunneling (OCT) are generally described herein. OCT procedures are used for scanning and association with a co-located or non-co-located peer AP. The OCT procedures include communicating a Probe/Re-authentication/Re-association Request frame from a STA using an OCT Request frame to the peer AP and receiving a Probe/Re-authentication/Re-association Response frame from the peer AP using another OCT Request frame. The communications between the STA and the AP are either in the same frequency band or a different frequency band as the OCT communications between the AP and the peer AP.

20 Claims, 10 Drawing Sheets

ZERO LATENCY BSS TRANSITION WITH ON-CHANNEL TUNNELING (OCT)

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11ax. Some embodiments relate to methods, computer readable media, and apparatus for basic service set (BSS) handover.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may to operate with both newer protocols and with legacy device protocols. Further complexities arise due to the advent of wireless operation in access points (APs) that use channels in different frequency bands. In particular, roaming across different frequency bands may result in latency issues.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
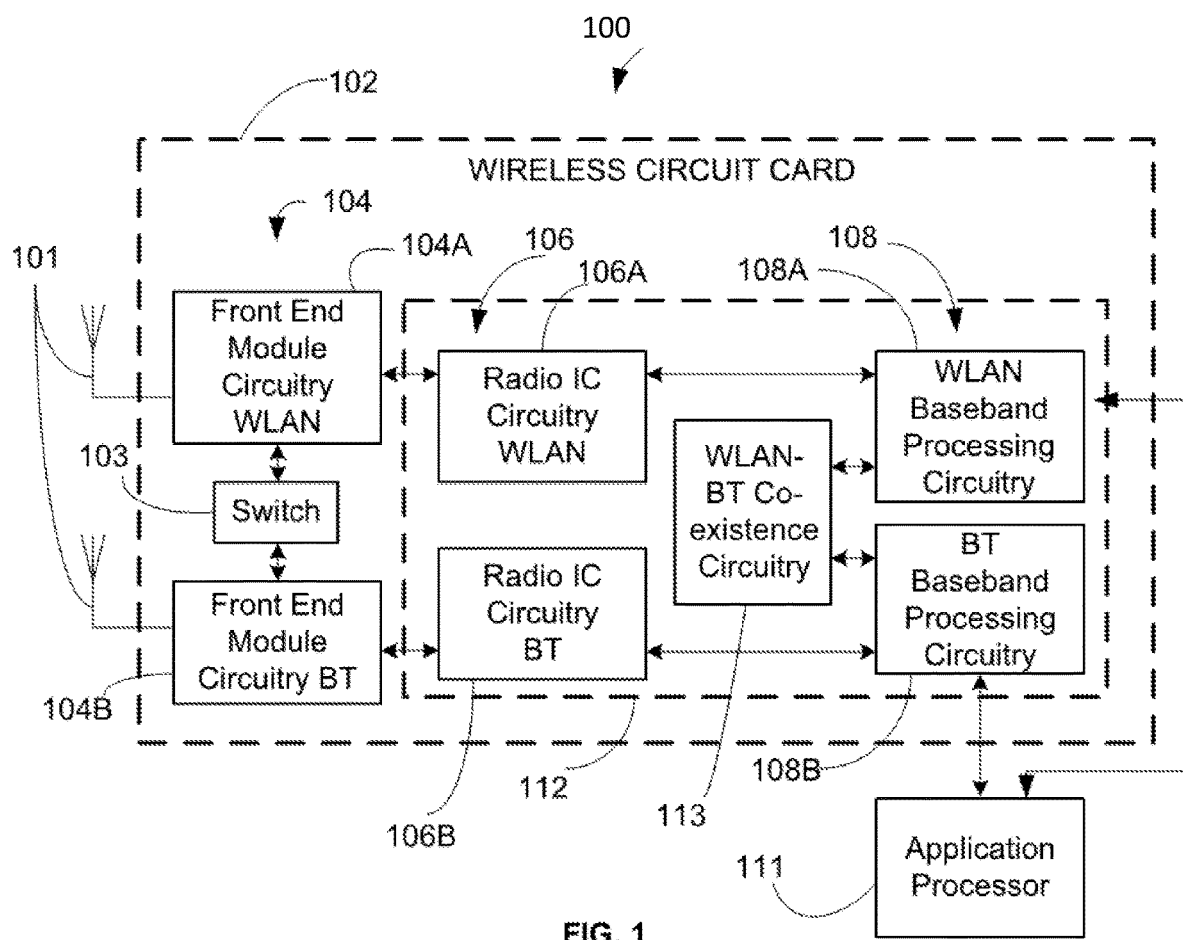
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
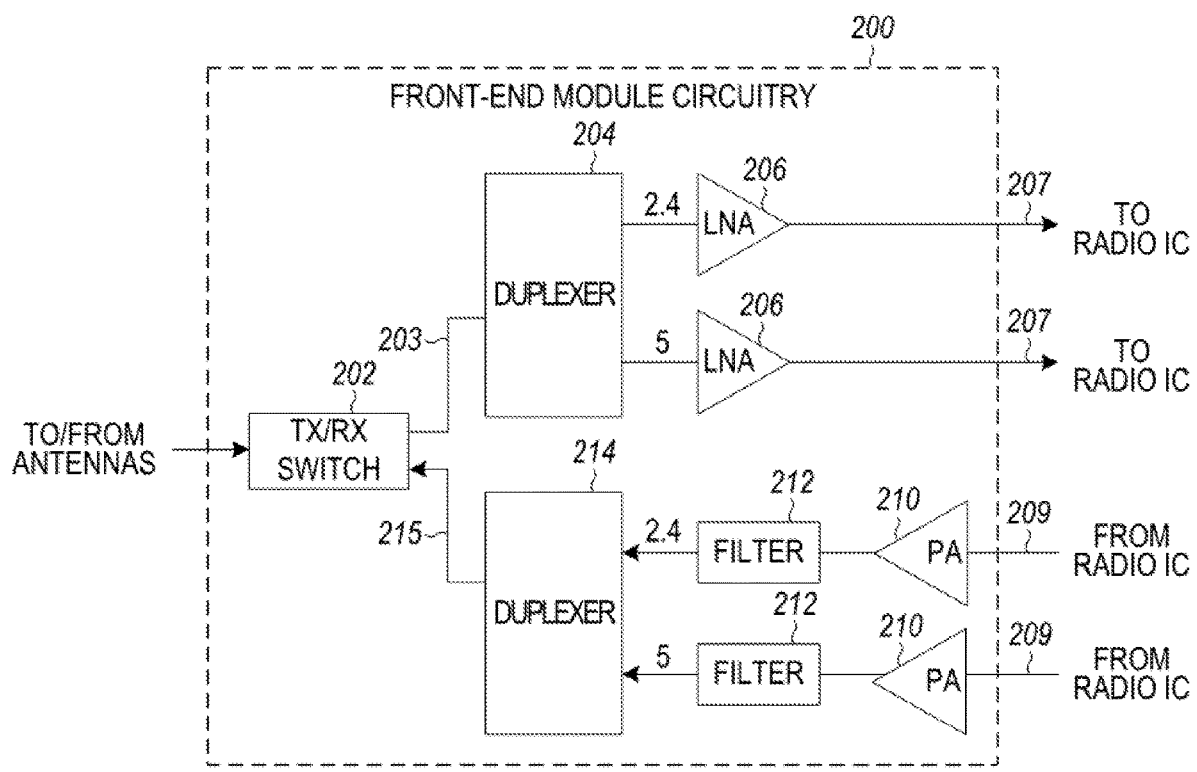
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
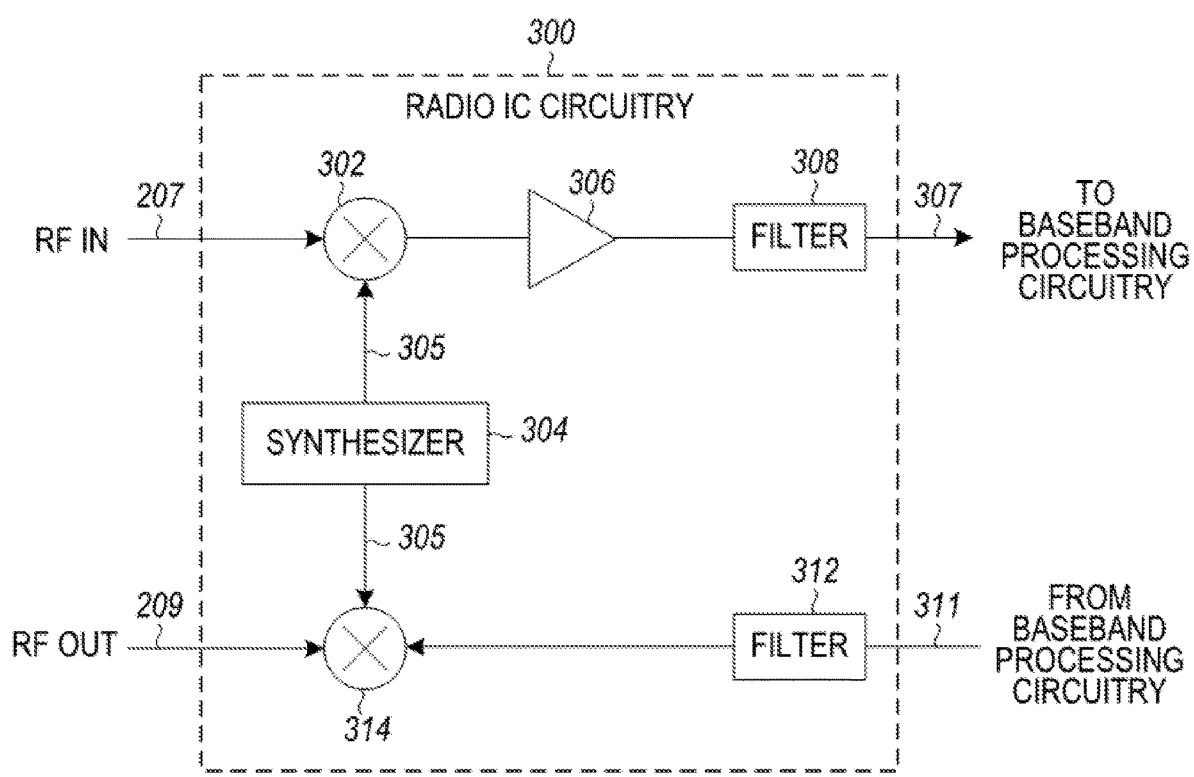
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
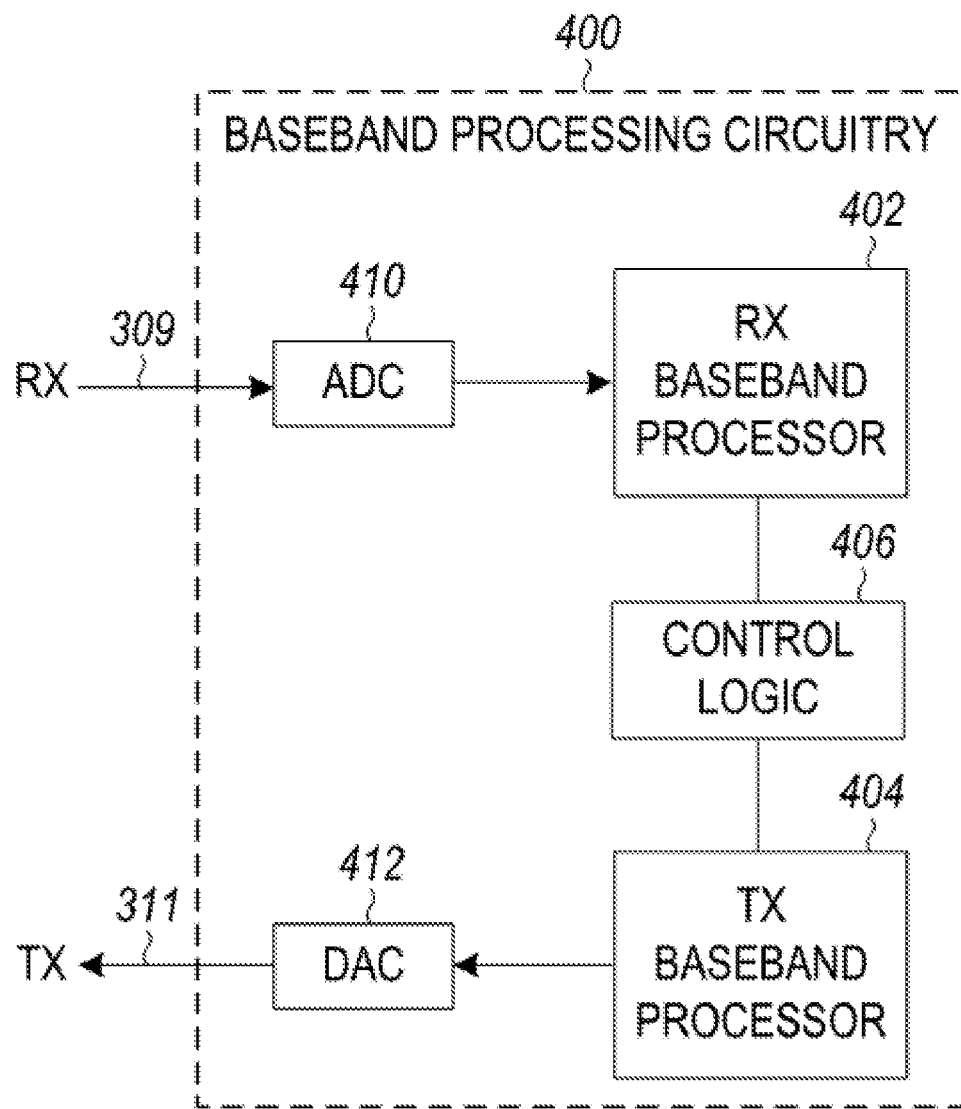
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
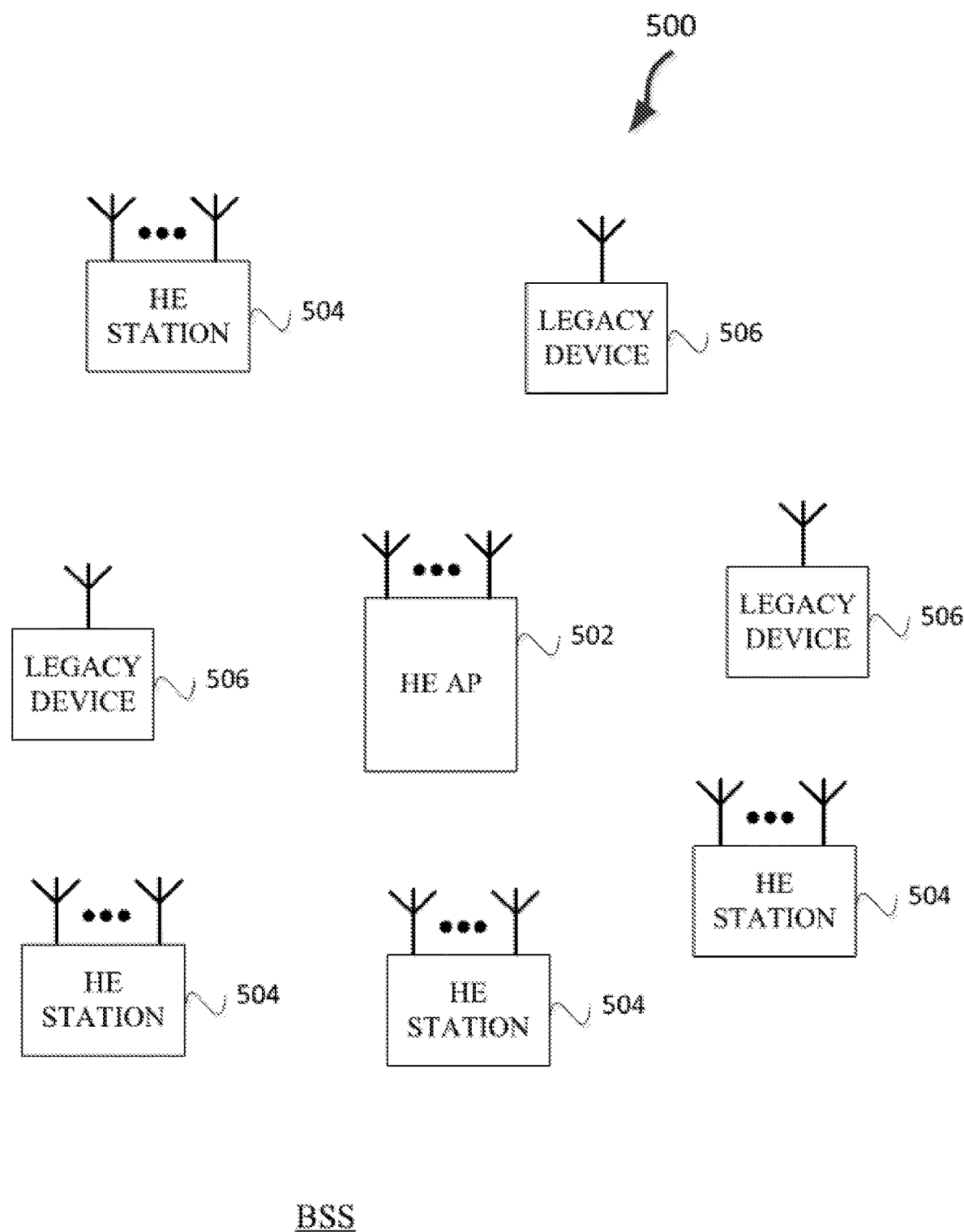
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be an AP, a plurality of high-efficiency wireless (e.g., IEEE 802.11ax) (HE) stations 504, and a plurality of legacy (e.g., IEEE 802.11n/ac) devices 506.

The HE AP 502 may be an AP using the IEEE 802.11 to transmit and receive. The HE AP 502 may be a base station. The HE AP 502 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one HE AP 502 that is part of an extended service set (ESS). A controller (not illustrated) may store information that is common to the more than one HE APs 502.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. The HE STAs 504 may be wireless transmit and receive devices such as cellular telephones, portable electronic wireless communication devices, smart telephones, handheld wireless devices, wireless glasses, wireless watches, wireless personal devices, tablets, or other devices that may be transmitting and receiving using the IEEE 802.11 protocol such as IEEE 802.11ax or another wireless protocol. In some embodiments, the HE STAs 504 may be termed high efficiency (HE) stations.

The HE AP 502 may communicate with legacy devices 506 in accordance with legacy IEEE 802.11 communication techniques. In example embodiments, the HE AP 502 may also be configured to communicate with HE STAs 504 in accordance with legacy IEEE 802.11 communication techniques.

In some embodiments, a HE frame may be configurable to have the same bandwidth as a channel. The HE frame may be a physical Layer Convergence Procedure (PLCP) Protocol Data Unit (PPDU). In some embodiments, there may be different types of PPDUs that may have different fields and different physical layers and/or different media access control (MAC) layers.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2x996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE frame may be configured for transmitting a number of spatial streams, which may be in accordance with MU-MIMO and may be in accordance with OFDMA. In other embodiments, the HE AP 502, HE STA 504, and/or legacy device 506 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11 embodiments, e.g, IEEE 802.11ax embodiments, a HE AP 502 may operate as a master station which may be arranged to contend for a wireless medium (e.g., during a contention period) to receive exclusive control of the medium for an HE control period. In some embodiments, the HE control period may be termed a transmission opportunity (TXOP). The HE AP 502 may transmit a HE master-sync transmission, which may be a trigger frame or HE control and schedule transmission, at the beginning of the HE control period. The HE AP 502 may transmit a time duration of the TXOP and sub-channel information. During the HE control period, HE STAs 504 may communicate with the HE AP 502 in accordance with a non-contention based multiple access technique such as OFDMA or MU-MIMO. This is unlike conventional WLAN communications in which devices communicate in accordance with a contention-based communication technique, rather than a multiple access technique. During the HE control period, the HE AP 502 may communicate with HE stations 504 using one or more HE frames. During the HE control period, the HE STAs 504 may operate on a sub-channel smaller than the operating range of the HE AP 502. During the HE control period, legacy stations refrain from communicating. The legacy stations may need to receive the communication from the HE AP 502 to defer from communicating.

In accordance with some embodiments, during the TXOP the HE STAs 504 may contend for the wireless medium with the legacy devices 506 being excluded from contending for the wireless medium during the master-sync transmission. In some embodiments the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE AP 502 may also communicate with legacy stations 506 and/or HE stations 504 in accordance with legacy IEEE 802.11 communication techniques. In some embodiments, the HE AP 502 may also be configurable to communicate with HE stations 504 outside the HE TXOP in accordance with legacy IEEE 802.11 communication techniques, although this is not a requirement.

In some embodiments the HE station 504 may be a "group owner" (GO) for peer-to-peer modes of operation. A wireless device may be a HE station 502 or a HE AP 502.

In some embodiments, the HE station 504 and/or HE AP 502 may be configured to operate in accordance with IEEE 802.11mc. In example embodiments, the radio architecture of FIG. 1 is configured to implement the HE station 504 and/or the HE AP 502. In example embodiments, the front-end module circuitry of FIG. 2 is configured to implement the HE station 504 and/or the HE AP 502. In example embodiments, the radio IC circuitry of FIG. 3 is configured to implement the HE station 504 and/or the HE AP 502. In example embodiments, the base-band processing circuitry of FIG. 4 is configured to implement the HE station 504 and/or the HE AP 502.

In example embodiments, the HE stations 504, HE AP 502, an apparatus of the HE stations 504, and/or an apparatus of the HE AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-17.

In example embodiments, the HE station 504 and/or the HE AP 502 are configured to perform the methods and operations/functions described herein in conjunction with FIGS. 1-17. In example embodiments, an apparatus of the HE station 504 and/or an apparatus of the HE AP 502 are configured to perform the methods and functions described herein in conjunction with FIGS. 1-17. The term Wi-Fi may refer to one or more of the IEEE 802.11 communication standards. AP and STA may refer to HE access point 502 and/or HE station 504 as well as legacy devices 506.

In some embodiments, a HE AP STA may refer to a HE AP 502 and a HE STAs 504 that is operating a HE APs 502. In some embodiments, when an HE STA 504 is not operating as a HE AP, it may be referred to as a HE non-AP STA or HE non-AP. In some embodiments, HE STA 504 may be referred to as either a HE AP STA or a HE non-AP.

Figure 6:
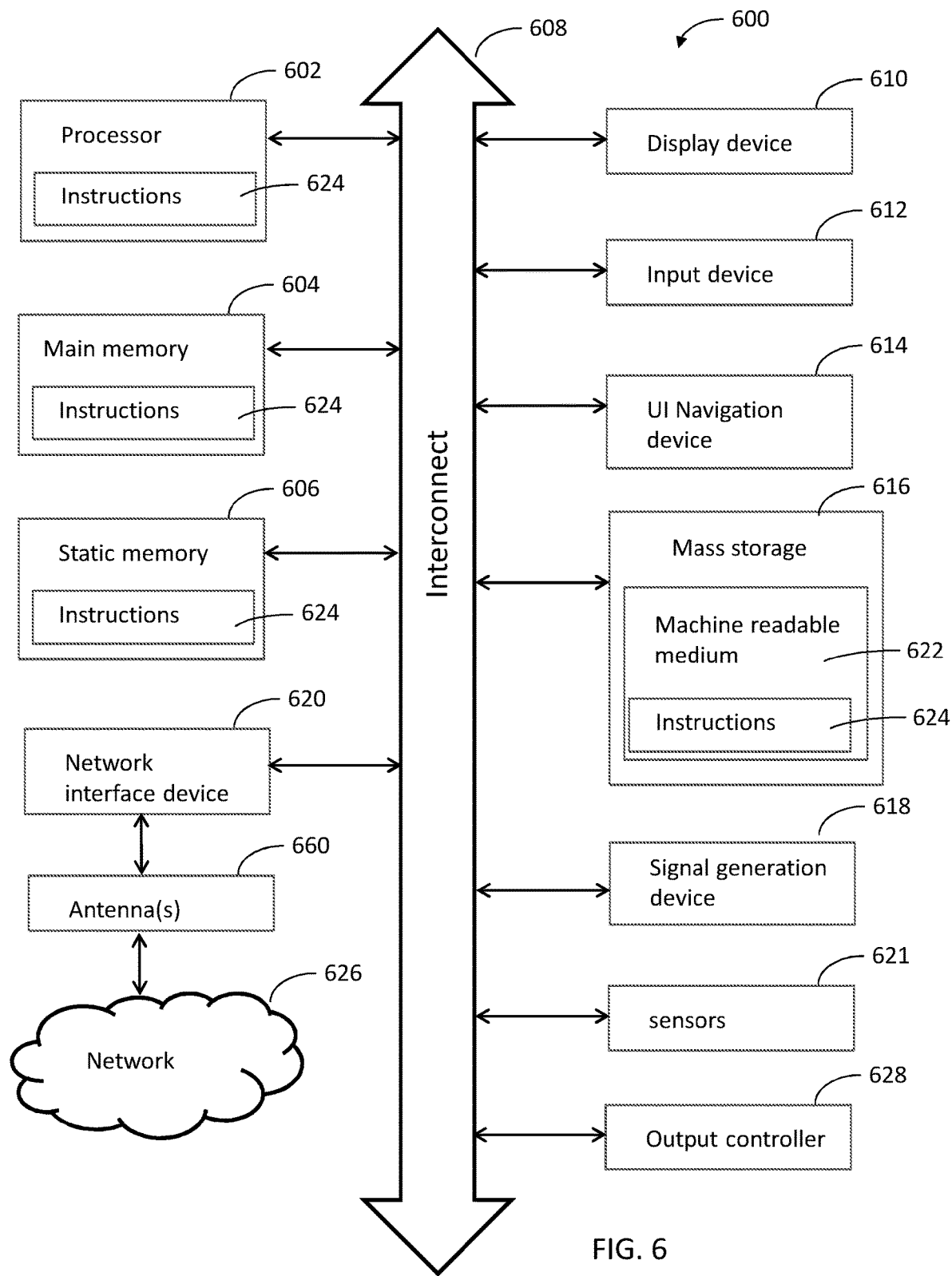
FIG. 6 illustrates a block diagram of an example machine upon which any one or more of the techniques (e.g., methodologies) discussed herein may perform in accordance with some embodiments.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a HE AP 502, HE station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared(IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
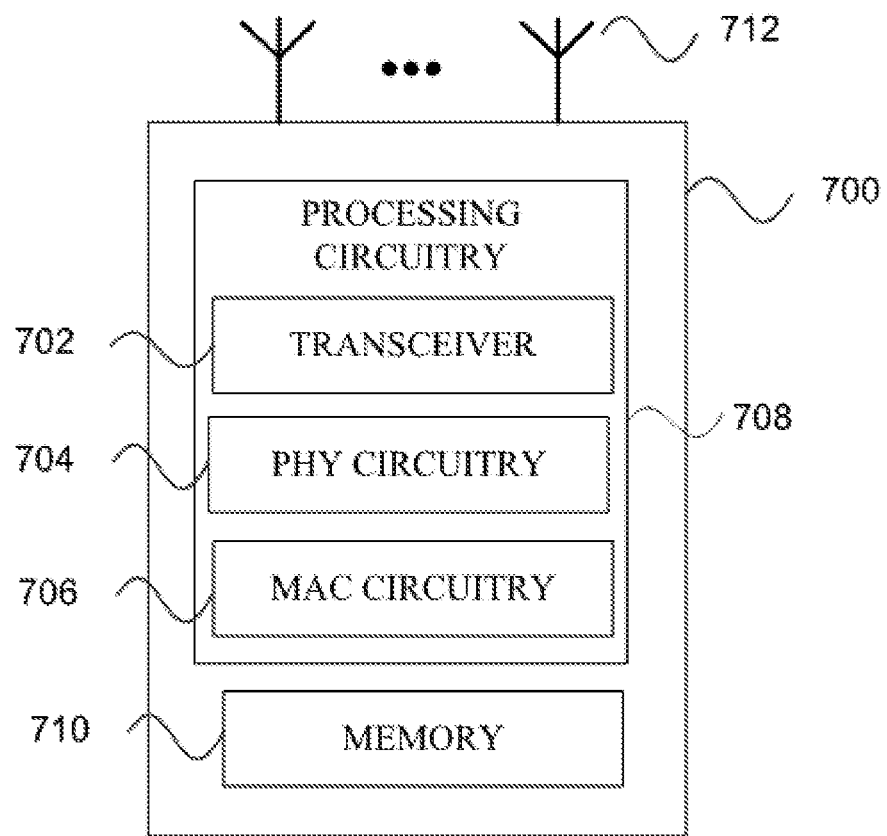
FIG. 7 illustrates a block diagram of an example wireless device upon which any one or more of the techniques (e.g., methodologies or operations) discussed herein may perform in accordance with some embodiments.

FIG. 7 illustrates a block diagram of an example wireless device 700 upon which any one or more of the techniques (e.g., methodologies or operations) discussed herein may perform. The wireless device 700 may be a HE device. The wireless device 700 may be a HE STA 504 and/or HE AP 502 (e.g., FIG. 5). A HE STA 504 and/or HE AP 502 may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., HE AP 502, HE STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., HE AP 502 and/or HE STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the HE stations 504 of FIG. 5 or wireless device 700) and an AP (e.g., the HE AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

As above, a WLAN may include an AP for the basic service set (BSS) and one or more STAs associated with the AP. The AP may relay data, for example, between an STA and a source/destination external to the BSS. The AP may transmit a beacon on a 20 MHz fixed channel (or multiples thereof, such as 40 MHz, 80 MHz or 160 MHz) in the 2.4 GHz and/or 5 GHz industrial, scientific and medical (ISM) band, which may be used by the STAs to establish a connection with the AP. The channel access may use Carrier Sense Multiple Access with Collision Avoidance (CSMA/CA), in which the STAs may sense the primary channel. If the channel is detected to be busy, the STA may back off. A single STA may transmit at any given time in a given BSS. Note that other sub 1 GHz modes of operation may support channels of 5 MHz, 10 MHz, or even 1 MHz, 2 MHz, 4 MHz, 8 MHz, and/or 16 MHz bandwidths.

In some cases, the STA and AP may be capable of multi-band operation. In this case, simultaneous operation on multiple frequency bands or operation on only one frequency band at a time may be supported. If the STA and AP are capable of multi-band operation, a communication session or isolated communications may be moved between bands.

The STA may discover the AP based on beacon frames (passive scanning) or probe request/response frames (active scanning), after which the AP may be the serving AP of the STA. In the former case, the AP may periodically transmit beacon frames to announce the presence of the WLAN and synchronize the APs of the BSS; in the latter case, the STAs may send a probe request frame and wait for a probe response frame from the AP. Beacon frames may include an IEEE 802.11 MAC header, body and frame check sequence (FCS). Information contained in different fields of the beacon frame may include, for example, a timestamp for synchronization, a beacon interval to indicate the time interval between Target Beacon Transmission Times (TBTTs), capability information that contains information about capability of the AP and network (as well as the type of network), service set ID (SSID), supported rates, frequency-hopping (FH) parameter set, direct-sequence (DS) parameter set, contention-free (CF) parameter set, independent basic service set (IBSS) parameter set, and traffic indication map (TIM). The probe request frame may be to a broadcast address and contain similar information as the beacon frame (other than, e.g., the time interval). The STAs may then start a timer to wait for the probe response frame. If the timer expires before the STAs receives the probe response frame, the STAs may move to the next channel and repeat transmission of the probe request frame.

In some circumstances, an optimized connectivity procedure may be used to reduce the beacon interval dramatically (e.g., from 100 ms to 20 ms). In this case, to avoid the excessive consumption of resources, a shorter beacon format (Fast Initial Link Setup (FILS) Discovery) may be used for the optimized beacons that are used between the standard beacons. The AP may include information about neighboring APs in a Reduced Neighbor Report in the optimized beacons. The Reduced Neighbor Report may also be included in fast initial link setup discovery and probe responses. The Reduced Neighbor Report may be field used to transmit information regarding a different AP.

The multi-band AP may operate on channels in multiple frequency bands, e.g., the 2.4 GHz, 5 GHz, 6 GHz, or another GHz band (such as the 60 GHz band). Multiband operation may include setup, configuration, tear down, and/or transfer of sessions between frequency bands. For example, the AP may operate on a 2.4 or 5 GHz channel and may additionally have one or more co-located APs operating at 6 GHz with the same service set ID (SSID). In this case, beacon frames and probe response frames transmitted by the AP or by the transmitted basic service set ID (BSSID) of the same multiple BSSID set as the AP may include, for each of the co-located APs, a TBTT Information field in a Reduced Neighbor Report element with the BSSID field set to the BSSID of the co-located AP, and with either the short SSID field set to the short SSID of the co-located AP or the same SSID subfield in the BSS parameters subfield is set to 1. An exception to this information may be if the AP transmits an individually addressed Probe Response frame to a STA that has signaled that the STA does not support operating in the 6 GHz band in a Supported Operating Classes element of the probe request, or if the AP operating at 6 GHz does not intend to be discovered by STAs.

If an AP operating on a 2.4 or 5 GHz channel has a co-located AP operating at 6 GHz with a different SSID, and no other co-located AP operating on a 2.4 or 5 GHz channel indicates the 6 GHz AP in a Reduced Neighbor Report of beacon and probe response frames, then beacon and probe response frames transmitted by the AP (or by the transmitted BSSID of the same multiple BSSID set as the AP) may include a TBTT Information field in a Reduced Neighbor Report element with the BSSID field and the short SSID field set to the BSSID and short SSID of the co-located AP. An exception to this information may be if the AP transmits an individually addressed Probe Response frame to a STA that has signaled that it does not support operating in the 6 GHz band (see 9.4.2.53 (Supported Operating Classes element)) or if the AP operating at 6 GHz does not intend to be discovered by STAs.

In some cases, it may be desirable to use different bands for different messages. For example, it may be desirable to forward probe request/response, association and authentication frames between the co-located APs (the reporting AP and the co-located reported AP) using the on-channel tunneling (OCT) procedure. By using OCT, a STA may encapsulate a packet and transmit the packet on another frequency band.

OCT and Fast Session Transfer (FST) (handover) may be automatically supported if a STA is part of a multi-band capable device. In other words, a STA that transmits a Multi-band element is assumed to support FST and OCT. However, in practice, there is no dependency between FST and OCT: either one or both can be supported by a device. Therefore, independent capabilities may be provided for FST and OCT. OCT is supported by several frame types, including for (re)association, ADD Block ACK Request (ADDBA—a management frame which is used to negotiate the use of Block ACK), Add Traffic Specification (ADDTS), etc. As described herein, the Multi-band element may be added to the SCAN primitive to use OCT with probe frames.

When OCT is available, the reporting AP may set the OCT recommended subfield to 1 (OCT is available) in the BSS Parameters subfield of the TBTT Information field in the Reduced Neighbor Report element if both the reporting AP and the reported AP support OCT and the co-located bit is 1 (the reporting AP and the reported AP are co-located) in the TBTT Information Header subfield of the same neighbor AP Information field.

A reporting AP may also set the OCT Recommended subfield to 1 in the BSS Parameters subfield of the TBTT Information field in the Reduced Neighbor Report element if both the reporting AP and the reported AP have the same SSID and support OCT and the co-located bit is 0 in the TBTT Information Header subfield of the same neighbor AP Information field. If the OCT Recommended subfield is set to 1 in the Neighbor AP Information field describing a reported HE AP in the Reduced Neighbor Report element, then a non-AP STA that supports OCT may use the OCT procedure described in IEEE 802.11 section 11.31.5 (OCT operation) to perform active scanning, authentication and/or association with the reported AP through over-the-air transmissions with the AP that sent the Reduced Neighbor Report element.

The Reduced Neighbor Report element may contain, among others, a High Efficiency subfield, an ER BSS subfield, a Co-Located AP subfield, an Unsolicited Probe Responses Active subfield, a Member Of ESS With 2.4/5 GHz Co-Located AP subfield, an OCT Supported With Reported AP subfield, and a Co-Located With 6 GHz AP subfield. The High Efficiency subfield is set to 1 to indicate that the AP represented by this BSSID is an HE AP and that the HE Capabilities element (or HE Operation element), if included as a subelement in the report, is identical in content to the HE Capabilities element (or HE Operation element) included in the neighboring AP's Beacon frame. Otherwise the High Efficiency subfield is set to 0. The ER BSS subfield is set to 1 if the BSS corresponding to the HE AP representing this BSSID is an ER BSS transmitting Beacon frames using an HE ER SU PPDU. Otherwise the ER BSS subfield is set to 0. The Co-Located AP subfield is set to 1 to indicate that the AP reported in the Neighbor Report element is in the same co-located AP set as the AP sending the Neighbor Report element. The Unsolicited Probe Responses Active subfield is set to 1 if the reported AP is part of an ESS where all the APs that operate in the same channel as the reported AP and that might be detected by a STA receiving the frame have dot11UnsolicitedProbeResponseOptionActivated equal to true and so are transmitting unsolicited Probe Response frames every 20 TUs or less. The Unsolicited Probe Responses Active subfield is set to 0 otherwise or if the reporting AP does not have that information. The Member Of ESS With 2.4/5 GHz Co-Located AP subfield is set to 1 if the reported AP is part of an ESS where each AP in the ESS and operating in the same band as the reported AP (irrespective of the operating channel in that band) that might be detected by a STA receiving the frame has dot11MemberOfColocat-ed6GHzESSOptionActivated
equal to true and also has a corresponding AP operating in the 2.4 GHz or 5 GHz bands that is in the same co-located AP set as that AP. The Member Of ESS With 2.4/5 GHz Co-Located AP subfield is set to 0 otherwise or if the reporting AP does not have that information. It is reserved if the reported AP is operating in the 2.4 GHz or 5 GHz bands. The Member Of ESS With 2.4/5 GHz Co-Located AP subfield indicates that the reported AP is part of an ESS that has no 6 GHz-only APs that might be detected by a STA receiving this frame. This means that all APs operating in the 6 GHz band that are part of that ESS that might be detected by a STA receiving this frame can be discovered in the 2.4 GHz and/or 5 GHz bands. An AP might be detected by a STA if the STA and the AP are on the same channel and in range. The OCT Supported With Reported AP subfield is set to 1 to indicate that OCT is supported to exchange MMP-DUs with the AP reported in the Neighbor Report element (see 11.32.5 (On-channel Tunneling (OCT) operation)), through over-the-air transmissions with the AP sending the Neighbor Report element. The OCT Supported With Reported AP subfield is set to 0 otherwise. The Co-Located With 6 GHz AP subfield is set to 1 to indicate that the AP reported by the Neighbor Report element is in the same co-located AP set as the 6 GHz AP and that the 6 GHz AP can be discovered by Management frames sent by the reported AP. The Co-Located With 6 GHz AP subfield is set to 0 otherwise.

This permits the use of the OCT procedure to perform scanning and complete association with a neighbor AP, whether or not the AP is co-located with the reporting AP. Based on this, BSS transition (roaming) using the OCT procedure is described herein.

In OCT operation, a multi-band capable device supports OCT if the OCT Not Supported subfield within the multi-band element of the multi-band capable device (STA or AP) is 0. A multi-band capable device that does not support OCT may ignore a received OCT Management MAC Protocol Data Unit (MMPDU). OCT allows a logical transmitting entity of a multi-band capable device to transmit an MMPDU that was constructed by a different logical (non-transmitting entity) of the same device. An MMPDU transmitted this way is referred to as an OCT MMPDU. The MAC Sublayer Management Entity (MLME) of the non-transmitting multi-band capable device that constructs or is the destination of an OCT MMPDU is referred to as a non-transmission MLME (NT-MLME). The MLME of the multi-band capable device that transmits or receives an OCT MMPDU over the air is referred to as a TR-MLME. An NT-MLME that constructs an OCT MMPDU destined to a peer NT-MLME does so according to the capabilities of the multi-band capable device that contains the peer NT-MLME. OCT can be used in conjunction with or independent from the FST setup protocol.

Several primitives may be used to describe scanning, tunneling and association, including: MMLE-SCAN.request, MMLE-SCAN.confirm, MLME-SCAN-STOP.request, MLME-OCTunnel.request, MLME-OCTunnel.Indication, MLME-OCTunnel.confirm, MLME-ASSOCIATE.response, and MLME-REASSOCIATE.response, for example.

The primitive parameters for a MMLE-SCAN.request may include: BSSType, BSSID, SSID, ScanType, ActiveScanType, ProbeDelay, ChannelList, MinChannelTime, MaxChannelTime, RequestInformation, SSID List, ChannelUsage, AccessNetworkType, homogenous ESS identifier (HESSID), MeshID, DiscoveryMode, FILSRequestParameters, ReportingOption, APConfigurationSequenceNumber, S1GRelayDiscovery, PV1ProbeResponseOption, S1GCapabilities, ChangeSequence, ELOperation, MaxAwayDuration, Multi-band local, Multi-band peer, and VendorSpecificInfo.

The Multi-band element may have the parameters:

| B0 B2 | B3 | B4 | B5 | B6 | B7 |
|---|---|---|---|---|---|
| STA Role | STA MAC Address Present | Pairwise Cipher Suite Present | FST Not Supported | OCT Not Supported | Reserved |
| Bits: 3 | 1 | 1 | 1 | 1 | 1 |

Subfield B5 (FST Not Supported) is set to 1 to indicate that that FST protocol is not supported. The FST protocol is supported otherwise. Similarly, subfield B6 (OCT Not Supported) is set to 1 to indicate that OCT is not supported. OCT is supported otherwise. A STA supports the FST protocol if the FST Not Supported subfield within the STA's Multi-band element is 0. A STA may not transmit an FST Setup Request frame to a peer STA that does not support the FST protocol. A STA that does not support the FST protocol may ignore a received FST Setup Request frame. A STA supports the OCT if the OCT Not Supported subfield within the STA's Multi-band element is 0. A STA may not perform OCT with a peer STA that does not support the OCT. A STA that does not support the OCT may ignore a received OCT MMPDU.

The ChannelList may be a set of integers that indicate available channels. Each channel may be elected from the valid channel range for the appropriate PHY and carrier set. The ChannelList specifies a list of channels that are examined when scanning for a BSS. If the Multi-band local and Multi-band peer parameters are present in the primitive, the ChannelList parameter specifies the channels used by the TR-MLME and the Multi-band peer parameter contains the channels to be scanned. The Multi-band local element specifies the parameters within the Multi-band element that are supported by the local MAC entity and is present if dot11MultibandImplemented is true and absent otherwise. The Multi-band peer specifies the parameters within the Multi-band element that are used to deliver messages to the peer MAC entity and is present if OCT is being used and absent otherwise.

The primitive parameters for a MMLE-SCAN.confirm may include BSSDescriptionSet, BSSDescriptionFromMeasurementPilotSet, BSSDescriptionFromFDSet, ResultCode, Multi-band local, Multi-band peer, and VendorSpecificInfo. The ResultCode may be an enumeration that includes: SUCCESS, INTERMEDIATE_SCAN_RESULT, NOT_SUPPORTED, PARTIAL_SCAN. The ResultCode indicates the result of the MLME-SCAN.confirm primitive. The INTERMEDIATE_SCAN_RESULT is used to report the discovered BSSs when the value of the ReportingOption parameter in the MLME-SCAN.request primitive is CHANNEL_SPECIFIC or IMMEDIATE and is valid if dot11FILSActivated is true. The PARTIAL_SCAN is used to report that not all channels have been scanned as specified in the ChannelList parameter, if present, of the corresponding MLME-SCAN.request primitive. The ScannedChannelList parameter contains the list of scanned channels. The ScannedChannelList is valid only if the ResultCode parameter has a value of PARTIAL_SCAN and specifies a list of channels that were scanned. This list of channels is a subset of the channels present in the ChannelList parameter of the corresponding MLME-SCAN.request primitive. The Timestamp element is the timestamp of the received frame (Probe Response/Beacon or PV1 Probe Response/S1G Beacon)

from the found BSS. When a PV1 Probe Response or an S1G Beacon frame is received, the timestamp is reconstructed. If the Multi-band local and Multi-band peer parameters are present in the MLME-SCAN.confirm primitive, the Timestamp parameter is reserved. The primitive parameters for a MLME-SCAN-STOP.request include the Multi-band local and Multi-band peer parameters, as above.

The primitive parameters for a tunnel request are as follows: MLME-OCTunnel.request (PeerSTAAddress, OCT MMPDU, Multi-band peer, Multi-band Source).

MMPDU to the correct MLME within the peer STA. The Multi-band Source field contains the Multi-band element that identifies the MLME that is the source of an OCT MMPDU. The values of the Band ID, Channel Number and BSSID fields contained in this element are used to identify the MLME within the STA.

The primitive parameters for a tunnel indication are as follows: MLME-OCTunnel.Indication (PeerSTAAddress, OCT MMPDU, Multi-band local, Multi-band Source, Tunnelex RXVECTOR).

| Name | Type | Valid range | Description |
| --- | --- | --- | --- |
| PeerSTAAddress | MAC Address | Any valid individual MAC address | Specifies the MAC address of the STA from which the On-channel Tunnel Request frame was received. |
| OCT MMPDU | OCT MMPDU structure | As defined in the On-channel Tunnel Request frame format (see 9.6.20.7 (On-channel Tunnel Request frame format)) | The OCT MMPDU carries the MMPDU that is being tunneled to the local MLME entity. |
| Multi-band local | Multi-band element | As defined in the Multi-band element format (see 9.4.2.138 (Multi-band element)) | The Multi-band element identifies the local MLME entity that should receive the OCT MMPDU. |
| Multi-band Source | Multi-band element | As defined in the Multi-band element format (see 9.4.2.138 (Multi-band element)) | The Multi-band element identifies the MLME entity that generated (i.e., is the source) of the OCT MMPDU. |
| Tunneled RXVECTOR | RXVECTOR | As defined by the PHY of the STA | Contains a copy of the RXVECTOR that the PHY passes to the MAC upon reception of the On-channel Tunnel Request frame. |

| Name | Type | Valid range | Description |
| --- | --- | --- | --- |
| PeerSTAAddress | MAC Address | Any valid individual MAC address | Specifies the MAC address of the STA to which the On-channel Tunnel Request frame is transmitted. |
| OCT MMPDU | OCT MMPDU structure | As defined in the On-channel Tunnel Request frame format (see 9.6.20.7 (On-channel Tunnel Request frame format)) | The OCT MMPDU carries the MMPDU to be tunneled to the specified MLME entity of the specified STA. |
| Multi-band peer | Multi-band element | As defined in the Multi-band element format (see 9.4.2.138 (Multi-band element)) | The Multi-band element identifies the peer MLME entity that should receive the OCT MMPDU. |
| Multi-band Source | Multi-band element | As defined in the Multi-band element format (see 9.4.2.138 (Multi-band element)) | The Multi-band element identifies the MLME entity that generated (i.e., is the source) of the OCT MMPDU. |

The On-channel Tunnel Request frame format contains a Multi-band field that contains the Multi-band element of the peer MLME to which the OCT MMPDU is destined. The values of the Band ID, Channel Number and BSSID fields contained in this element are used to deliver the OCT The primitive parameters for MLME-OCTunnel.confirm include the Result code, which indicates success or failure of the MLME-OCTunnel.request primitive. The MLME-OCTunnel.confirm is generated by the MLME as a result of an MLME-OCTunnel.request primitive to transmit an On-channel Tunnel Request frame and is used to notify the MLME of the results of the frame transmission.

Note that an FST Setup Request frame used to set up an FST Session includes a FSTSessionTimeout field and a BSSID field. The FSTSessionTimeout field is used to indicate the timeout value for FST session setup protocol. The FSTSessionTimeout field contains the duration, in time units (TUs), after which the FST setup is terminated. This field is reserved if the FST Not Supported subfield is 1. Similarly, the BSSID field specifies the BSSID of the BSS operating on the channel and frequency band indicated by the Channel Number and Band ID fields. When used as part of the on-channel tunneling operation, this field can contain a wildcard BSSID.

The primitive parameters for MLME-AS SOCIATE.response include PeerSTAAddress, ResultCode, AssociationID, RCPI, RSNI, RMEnabledCapabilities, Content of FT Authentication elements, SupportedOperatingClasses, TimeoutInterval, BSSMaxIdlePeriod, TIMBroadcastResponse, QoSMapSet, Multi-band local, Multi-band peer, FILSHLPContainer, FILSIPAddressAssignment, KeyDelivery, S1G Sector Operation, S1G Capabilities, AID Response, TSF Timer Accuracy, TWT, Sectorized Group ID List, MaxAwayDuration, S1GRelay, S1GRelayActivation, S1GOperation, HeaderCompression, SSTOperation, CDMG Capabilities, CMMG Capabilities, and VendorSpecificInfo. The primitive parameters for MLME-REASSOCIATE.response include PeerSTAAddress, ResultCode, AssociationID, RCPI, RSNI, RMEnabledCapabilities, Content of FT Authentication elements, SupportedOperatingClasses, TimeoutInterval, BSSMaxIdlePeriod, TIMBroadcastResponse, QoSMapSet, FMSResponse, DMSResponse, Multi-band local, Multi-band peer, FILSHLPContainer, FILSIPAddressAssignment, KeyDelivery, S1G Sector Operation, S1G Capabilities, AID Response, TSF Timer Accuracy, TWT, Sectorized Group ID List, MaxAwayDuration, S1GRelay, S1GRelayActivation, S1GOperation, HeaderCompression, SSTOperation, CDMG Capabilities, CMMG Capabilities, and VendorSpecificInfo.

The OCT procedure can be used both with the OCT MLME primitives and to transmit a response to a received On-channel Tunnel Request frame tunneling a Probe Request frame. The Timestamp field of the Probe Response frame tunneled in an On-channel Tunnel Request frame may be reserved. To perform the OCT procedure, the values of the Band ID, Channel Number and BSSID fields in a Multi-band element may be used to identify an MLME. All other fields in the Multi-band element may be reserved.

Except for the following cases, the values of the Band ID, Channel Number and BSSID fields in a Multi-band element may be used by an NT-MLME to deliver messages to a TR-MLME through the OCTunnel.request primitive, and used by a TR-MLME to deliver messages to an NT-MLME through the OCTunnel.indication primitive:

If the BSSID field is the wildcard BSSID, an MLME (either TR-MLME or NT-MLME) may not use the BSSID field in selecting the MLME to deliver a message and may, instead, invoke the corresponding primitive for all MLMEs that match the Band ID and Channel Number fields.

If the OCT MLME request primitive is the MLME-SCAN.request primitive with ScanType parameter set to ACTIVE and that includes the ChannelList parameter, the NT-MLME may not use the Channel Number field within the Multi-band local parameter of the MLME-SCAN.request primitive in selecting the TR-MLME to deliver a message and may, instead, invoke the OCTunnel.request primitive at the TR-MLME(s) that match the Band ID field and BSSID field within Multi-band local parameter, and the channels specified in the ChannelList parameter.

If the Channel Number field is 0 and the OCT MLME request primitive is not the MLME-SCAN.request primitive with ScanType parameter set to ACTIVE and that includes the ChannelList parameter, an MLME (either TR-MLME or NT-MLME) may not use the Channel Number field in selecting the MLME to deliver a message and may, instead, invoke the corresponding primitive for all MLMEs that match the Band ID and BSSID fields.

If the Channel Number field is 0 and the OCT MLME request primitive is not the MLME-SCAN.request primitive with ScanType parameter set to ACTIVE and that includes the ChannelList parameter, and the BSSID field is the wildcard BSSID, an MLME (either TR-MLME or NT-MLME) may use neither the BSSID field nor the Channel Number field in selecting the MLME to deliver a message and may, instead, invoke the corresponding primitive for all MLMEs that match the Band ID field.

Figure 8:
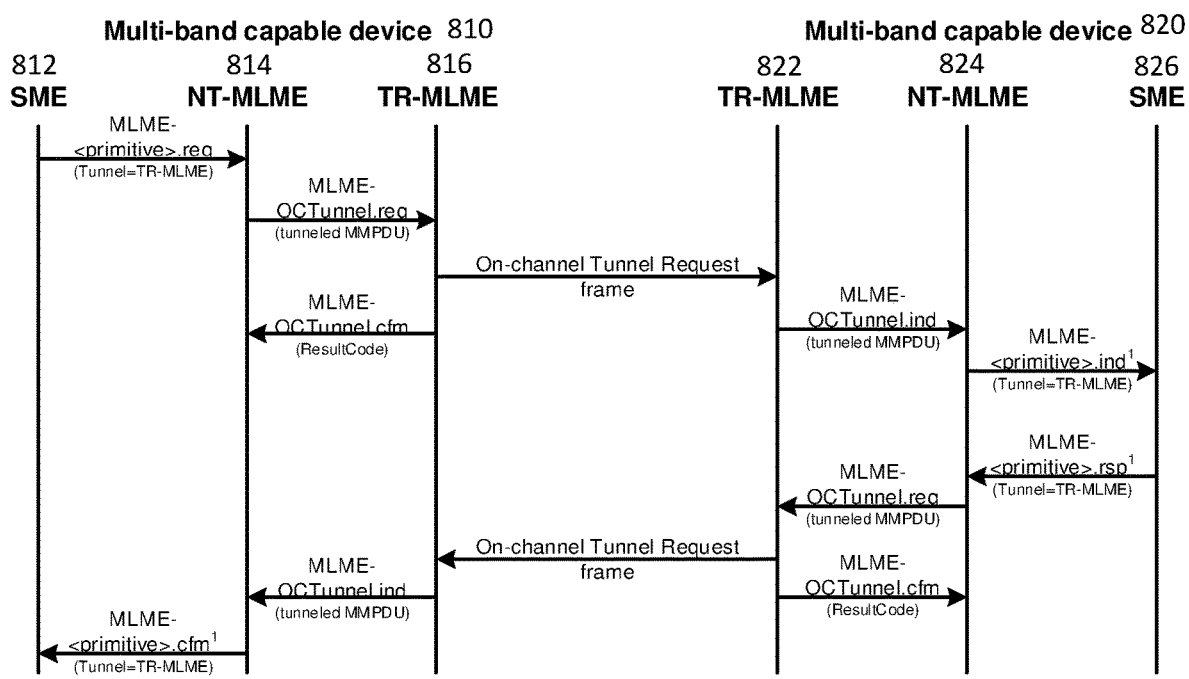
FIG. 8 illustrates an on-channel tunneling procedure, in accordance with some embodiments.

FIG. 8 illustrates an on-channel tunneling procedure in accordance with some embodiments. In this figure, <primitive> refers to the name of any of the MLME primitives defined in IEEE 801.11ax 6.3 (MLME SAP interface) that meets all of the following conditions: includes a peer Multi-band element used to identify the peer NT-MLME and a local Multi-band element used to identify the local TR-MLME. An MLME primitive meeting all of the above conditions is referred to as an OCT MLME primitive. MLME-AUTHENTICATE, MLME-ASSOCIATE, and MLME-REASSOCIATE are examples of primitives that are OCT MLME primitives.

To transmit a tunneled MMPDU, the Station Management Entity (SME) 812 of a multi-band capable device 810 generates an OCT MLME request primitive that includes the peer Multi-band element and the local Multi-band element. If the OCT MLME request primitive is the MLME-SCAN.request primitive with ScanType parameter set to ACTIVE, the BSSID field within the peer Multi-band element may be set to the value of the BSSID parameter in the MLME-SCAN.request primitive and the BSSID field within the local Multi-band element may be set to an individual MAC address.

An NT-MLME 814 of the multi-band capable device 810 receiving an OCT MLME request primitive may process the request and construct an OCT MMPDU corresponding to the primitive in question for transmission to a transmit MLME (TR-MLME) 816. The NT-MLME 814 may not transmit any frame as a result of this primitive but may instead generate an MLME-OCTunnel.request primitive with parameters including the OCT MMPDU, the Multi-band peer parameter set to the peer Multi-band element, and the Multi-band Source parameter set to the Multi-band element identifying the NT-MLME 812.

The NT-MLME 812 may not issue an MLME-OCTunnel.request primitive if the selected TR-MLME 816 does not exist. Similarly, the TR-MLME 816 may not issue an MLME-OCTunnel.indication primitive if a selected NT-MLME 814 does not exist. A single OCT MLME request primitive received by an NT-MLME 814 may result in the invocation of one or more MLME-OCTunnel.request primitives at the TR-MLME 816. Each invocation may be towards the same or towards a different TR-MLME.

A TR-MLME 816 (of the multi-band capable device 810) receiving an MLME-OCTunnel.request primitive may transmit an On-channel Tunnel Request frame addressed to the peer TR-MLME 822 of the peer multi-band capable device 820 and that includes the tunneled MMPDU. The peer TR-MLME(s) 822 may be identified by the PeerSTAAddress parameter of the MLME-OCTunnel.request primitive. In some embodiments, the On-channel Tunnel Request frame may not be group-addressed. Once the On-channel Tunnel Request frame is transmitted and acknowledged or attempts to transmit the frame are abandoned, the TR-MLME 816 may issue an MLME-OCTunnel.confirm primitive, with the appropriate result code, to inform the NT-MLME 814 of the outcome of the frame transmission to the peer TR-MLME 822.

An On-channel Tunnel Request frame may not be transmitted as a Public Action frame unless the tunneled MMPDU does not require management frame protection. A receiving TR-MLME (the peer TR-MLME) 822 may silently ignore the received On-channel Tunnel Request frame if that frame is not targeting an NT-MLME in the same multi-band capable device 820 with the TR-MLME 822.

A (peer) TR-MLME 822 receiving an On-channel Tunnel Request frame from the TR-MLME 812 may generate an MLME-OCTunnel.indication primitive with the Multi-band local parameter set to the Multi-band element identifying the TR-MLME 822, the Multi-band Source parameter set to the value of the Multi-band Source field contained in the Onchannel Tunnel Request frame and the Tunneled RXVECTOR parameter set to the RXVECTOR of the On-channel Tunnel Request frame. The MLME-OCTunnel.indication primitive may be sent to the NT-MLME 824 identified by the peer Multi-band element contained within the received On-channel Tunnel Request frame.

An NT-MLME 824 receiving an MLME-OCTunnel.indication primitive (the peer NT-MLME 824 receiving the MLME-OCTunnel.indication primitive from the peer TR-MLME 822) may process the OCT MMPDU parameter of the primitive as if the MMPDU had been received over the air. One exception is that an Ack frame, if any, may not be sent to the peer TR-MLME 822 as a response to the reception of the MMPDU. An NT-MLME 824 receiving an MLME-OCTunnel.indication primitive may also generate an OCT MLME indication primitive, if one is defined, corresponding to the frame type of tunneled MMPDU. This primitive may be generated to the SME 826 of the peer multi-band capable device 820, which processes the MMPDU. The Multi-band local parameter of the OCT MLME indication primitive may be set to the value of the Multi-band local parameter of the MLME-OCTunnel.indication primitive and the Multi-band peer parameter may be set to the value of the Multi-band Source parameter of the MLME-OCTunnel.indication primitive.

In the case of a .request/.indication primitive, the process stops. Otherwise, the process continues as described below and shown in FIG. 8. In this case, the peer SME 826 may respond to the reception of an OCT MLME indication primitive by generating the corresponding OCT MLME response primitive. This response may include the peer Multi-band element and the local Multi-band element.

An NT-MLME 824 receiving an OCT MLME response primitive, if one is defined, or generating a response by itself, if no OCT MLME response primitive is defined (e.g., MLME-SCAN.response is not defined), may process the response and construct an OCT MMPDU corresponding to the primitive in question.

The NT-MLME 824 may not transmit any frame as a result of this primitive. The NT-MLME 824 may instead generate an MLME-OCTunnel.request primitive with parameters including the OCT MMPDU, the Multi-band peer parameter set to the peer Multi-band element and the Multi-band Source parameter set to the Multi-band element identifying the NT-MLME 824. If no OCT MLME response primitive is defined, the Multi-band peer parameter may be set to the value of the Multi-band Source parameter received in the corresponding MLME-OCTunnel.indication primitive. The MLME-OCTunnel.request primitive may be generated to the TR-MLME 822 identified by the local Multi-band element specified in the OCT MLME response primitive, if one is defined, or to the TR-MLME 822 identified by the Multi-band local parameter of the MLME-OCTunnel.indication primitive that triggered the response, if no OCT MLME response primitive is defined.

A TR-MLME 816 receiving the MLME-OCTunnel.request primitive may transmit an On-channel Tunnel Request frame addressed to the peer TR-MLME 822 that includes the tunneled MMPDU. The peer TR-MLME(s) 822 may be identified by the PeerSTAAddress parameter of the MLME-OCTunnel.request primitive. Once the Onchannel Tunnel Request frame is transmitted and acknowledged or attempts to transmit the frame are abandoned, the TR-MLME 812 may issue an MLME-OCTunnel.confirm primitive, with the appropriate result code, to inform the NT-MLME 814 of the outcome of the frame transmission.

The TR-MLME 816 receiving an On-channel Tunnel Request frame may generate an MLME-OCTunnel.indication primitive with the Multi-band local parameter set to the Multi-band element identifying the TR-MLME 816, the Multi-band Source parameter set to the value of the Multi-band Source field contained in the On-channel Tunnel Request frame and the Tunneled RXVECTOR parameter set to the RXVECTOR of the On-channel Tunnel Request frame. The MLME-OCTunnel.indication primitive may be generated to the NT-MLME 814 identified by the peer Multi-band element contained within the received On-channel Tunnel Request frame.

The NT-MLME 814 receiving an MLME-OCTunnel.indication primitive may process the OCT MMPDU parameter of the primitive as if the MMPDU had been received over the air. The NT-MLME 814 may also generate an OCT MLME confirm primitive, if one is defined, corresponding to the frame type of the tunneled MMPDU. This primitive may be directed at the SME 812 and has the Multi-band local parameter set to the value of the Multi-band local parameter of the MLME-OCTunnel.indication primitive and the Multi-band peer parameter set to the value of the Multi-band Source parameter of the MLME-OCTunnel.indication primitive. If the OCT MLME confirm primitive is the MLME-SCAN.confirm primitive and the NT-MLME 814 did not scan all the channels specified in the corresponding MLME-SCAN.request primitive, the ResultCode parameter in the MLME-SCAN.confirm primitive may be set to PARTIAL_SCAN and the ScannedChannelList parameter shall list all channels that have been scanned.

An NT-MLME 814 receiving an MLME-OCTunnel.confirm primitive may take action, if there is one, based on the success or otherwise of the OCT MMPDU transmission by the TR-MLME 816.

Figure 9:
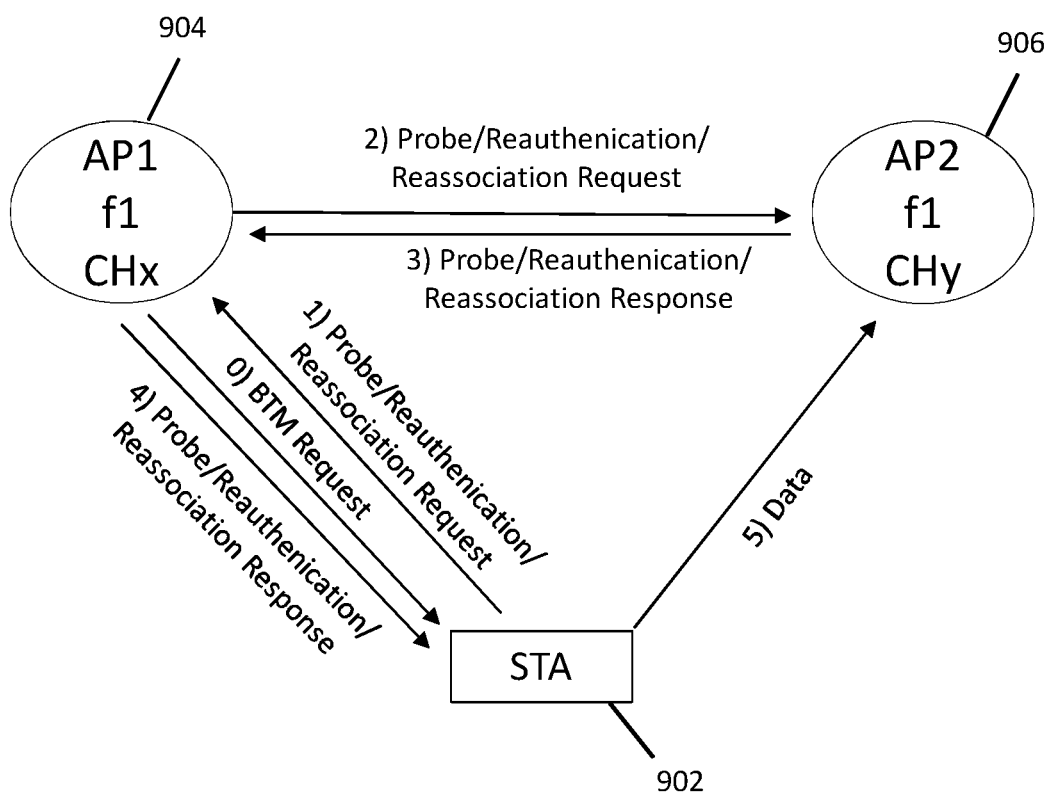
FIG. 9 illustrates an on-channel tunneling procedure with non-co-located APs, in accordance with some embodiments.
Figure 10:
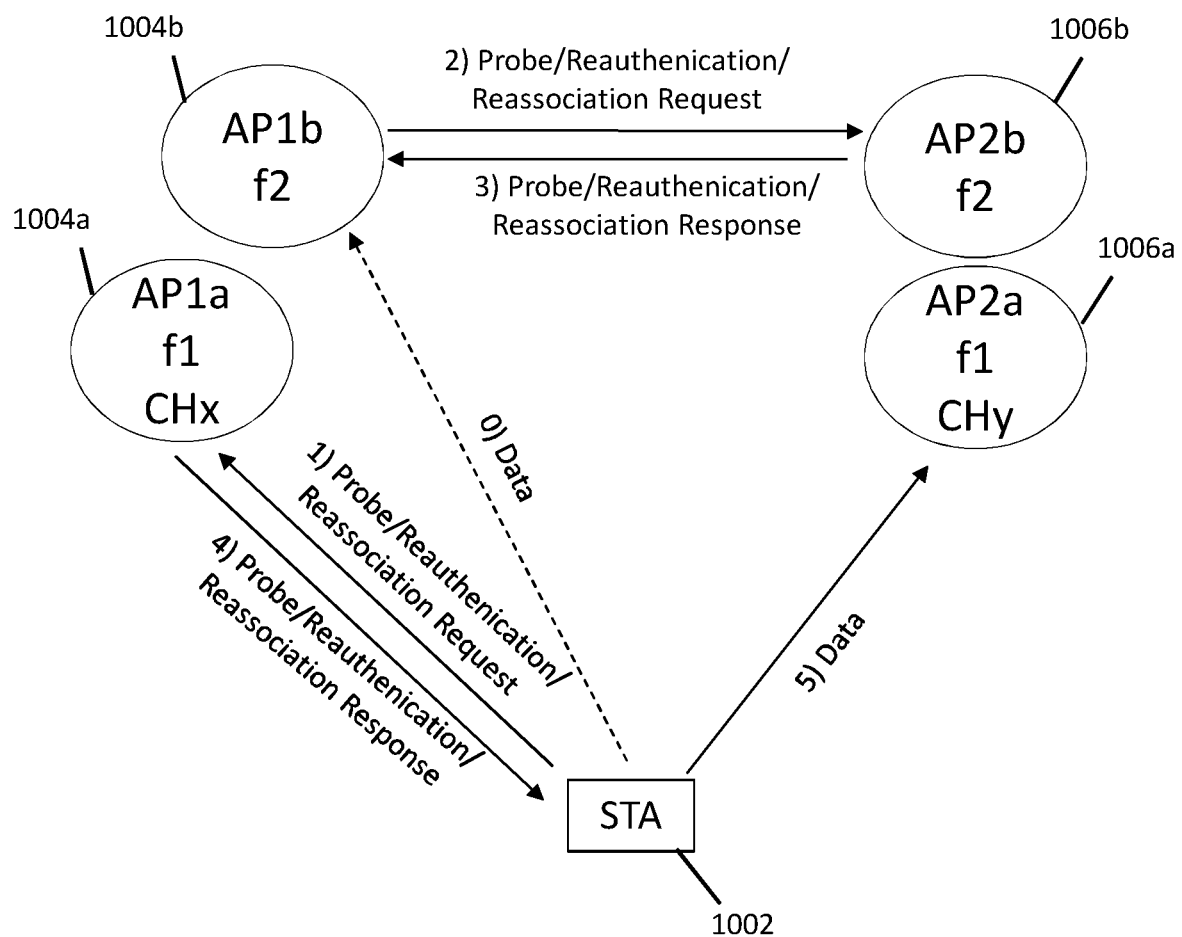
FIG. 10 illustrates an on-channel tunneling procedure with non-co-located APs, in accordance with some embodiments.

FIG. 9 illustrates an on-channel tunneling procedure with non-co-located APs, in accordance with some embodiments. FIG. 10 illustrates an on-channel tunneling procedure with non-co-located APs, in accordance with some embodiments. In particular, as described in more detail above, FIG. 9 illustrates an embodiment in which the multi-band capable devices (AP 904 and peer AP 906) communicate with the STA 902 using the same frequency band but different channels.

As shown in FIG. 9, and described in more detail above, the STA 902 transmits on a first channel (channel x) Probe/Re-authentication/Re-association Requests to the serving AP 904 to transition to the peer AP 906. The request is provided prior to the STA 902 de-associating from the serving AP 902 and either listening for a beacon frame from, or sending a probe frame to, the peer AP 906. The peer AP 906 is identified by the STA 902 via a Neighbor Report provided by the serving AP 904. In some cases, the transition to the new BSS containing the peer AP 906 may be instituted by the serving AP 904 transmitting a BSS Transition Management (BTM) request to the STA 902, which precipitates, for example, a Probe Request frame from the STA 902 to the serving AP 904. The re-authentication and re-association frame communications use a similar OCT procedure and thus are not further described.

The serving AP 904 may determine that the OCT procedure is to be used and transmit an OCT tunnel request frame to the peer AP 906. The OCT tunnel request frame encapsulates the Probe Request frame and may be transmitted OTA on a different frequency band or within the same frequency band as communications between the STA 902 and the serving AP 904.

The peer AP 906 determines whether or not the STA 902 is able to be associated with the peer AP 906 and sends a Probe Response frame in response to the Probe Request frame. The peer AP 906 transmits the Probe Response frame to the serving AP 904 in an OCT tunnel request frame using the same frequency as the OCT tunnel request frame carrying the Probe Request frame.

The serving AP 904 determines that the OCT tunnel request frame contains the Probe Response frame for the STA 902 and transmits the Probe Response frame to the STA 902 on the first channel. The STA 902, after performing any further information exchanges with the peer AP 906 through the serving AP 904 using the OCT procedure, then starts communicating with the peer AP 906 as the new serving AP instead of communicating with the old serving AP 904.

In particular, as described in more detail above, FIG. 10 illustrates an embodiment in which the multi-band capable devices (AP 1004a and peer AP 1006a) communicate with the STA 1002 using the same frequency band (e.g., 2.4 GHz) but different channels, while the co-located serving AP 1004b (co-located with the AP 1004a) and the co-located peer AP 1006b (co-located with the peer AP 1006a) communicate OCT frames using a different frequency band (e.g., 6 GHz).

Similar to the communications shown in FIG. 9, in FIG. 10, the STA 1002 transmits on a first channel (channel x) of a first frequency band Probe/Re-authentication/Re-association Requests to the serving AP 1004a to transition to the peer AP 1006a. The serving AP 1004a may have a co-located serving AP 1004b to communicate with a co-located peer AP 1006b of the peer AP 1006a. The request is provided prior to the STA 1002 de-associating from the serving AP 1002a and either listening for a beacon frame from, or sending a probe frame to, the peer AP 1006a. The peer AP 1006a is identified by the STA 1002 via a Neighbor Report provided by the serving AP 1004a. In some cases, the transition to the new BSS containing the peer AP 1006 may be instituted by the serving AP 1004a transmitting a BTM request to the STA 1002, which precipitates, for example, a Probe Request frame from the STA 1002 to the serving AP 1004a. The re-authentication and re-association frame communications use a similar OCT procedure and thus are not further described.

The serving AP 1004a may determine that the OCT procedure is to be used and transmit an OCT tunnel request to the co-located serving AP 1004b. The co-located serving AP 1004b may in response transmit an OCT tunnel request frame to the co-located peer AP 1006b using the second frequency band. The OCT tunnel request and OCT tunnel request frame encapsulate the Probe Request frame.

The co-located peer AP 1006b may determine that the OCT tunnel request frame is to be provided to the peer AP 1006a, and transmit an OCT tunnel indication to the peer AP 1006a. The peer AP 1006a determines whether or not the STA 1002 is able to be associated with the peer AP 1006 and sends a Probe Response frame to the co-located peer AP 1006b in an OCT tunnel request in response to the Probe Request frame. The co-located peer AP 1006b may transmit the Probe Response frame to the co-located serving AP 1004b in an OCT tunnel request frame using the same frequency as the OCT tunnel request frame carrying the Probe Request frame.

The co-located serving AP 1004b may determine that the OCT tunnel request frame is to be provided to the serving AP 1004a, and transmit the Probe Response frame to the serving AP 1004a in an OCT tunnel indication. The serving AP 1004 may then transmit the Probe Response frame to the STA 1002 on the first channel using the first frequency band. The STA 1002, after performing any further information exchanges with the peer AP 1006a through the serving AP 1004a using the OCT procedure, then starts communicating with the peer AP 1006a as the new serving AP on another channel instead of communicating with the old serving AP 1004a. If the STA 1002 is capable of simultaneous communication on multiple frequencies, the STA 1002 may communicate with the serving AP 1004a or the co-located serving AP 1004b at the same time as with the peer AP 1006a or the co-located peer AP 1006b after association with the peer AP 1006a or the co-located peer AP 1006b is performed.

Thus, by using the OCT multi-band procedure described above, the SME of a multi-band capable device can instruct one of its MLMEs to use the OCT services provided by another MLME of the same multi-band capable device to communicate with a peer MLME of a peer multi-band capable device. This enables the SMEs of a pair of multi-band capable devices to provide a seamless FST, including performing (de)authentication and (re)association across bands/channels. The MLMEs that use the OCT services provided by another MLME within the same multiband capable device to communicate are referred to as being over-the-WM disabled with respect to each other. Following a frame exchange on the new band/channel (e.g., after FST), two peer over-the-WM disabled MLMEs can become over-the-WM enabled with respect to each other.

Example 1 is an apparatus of an access point (AP), the apparatus comprising: processing circuitry configured to: decode a Probe Request frame received from a station (STA) on a first frequency to transition to another basic service set (BSS), the probe request indicating a peer AP; determine that an on-channel tunneling (OCT) procedure is available between one of: the AP and the peer AP, or another AP and the peer AP, the other AP connected to the AP; in response to a determination that the OCT procedure is available between the AP and the peer AP, generate an OCT tunneling request frame comprising the Probe Request frame for transmission to the peer AP on the first frequency; and in response to a determination that the OCT procedure is available between the other AP and the peer AP, generate a medium access control layer (MAC) Sublayer Management Entity (MLME)-OCTunnel.request primitive comprising the Probe Request frame for transmission of the Probe Request frame in the OCT tunneling request frame by the other AP to the peer AP on a second frequency; and a memory configured to store the Probe Request frame.

In Example 2, the subject matter of Example 1 includes, wherein the processing circuitry is further configured to: generate, for transmission to the STA, a BSS Transition Management (BTM) request, the BTM comprising a neighbor report describing the peer AP with a request to transition to the peer AP, the Probe Request frame received in response to transmission to the BTM request.

In Example 3, the subject matter of Example 2 includes, wherein the processing circuitry is further configured to: generate a beacon frame comprising a Reduced Neighbor Report (RNR) element and an OCT Recommended bit, the RNR element comprising the neighbor report, the OCT Recommended bit indicating that the OCT procedure is available between the one of the AP and the peer AP, or the other AP and the peer AP.

In Example 4, the subject matter of Examples 1-3 includes, wherein the processing circuitry is further configured to: in response to a determination that the OCT procedure is available between the AP and the peer AP, generate at least one OCT tunneling request frame containing at least one of a re-authentication request and a re-association request for transmission to the peer AP on the first frequency; and in response to transmission of the at least one OCT tunneling request frame, decode at least one of a re-authentication response and a re-association response from the peer AP on the first frequency.

In Example 5, the subject matter of Examples 1-4 includes, wherein the processing circuitry is further configured to: in response to a determination that the OCT procedure is available between the other AP and the peer AP, generate at least one MLME-OCTunnel.request primitive comprising the at least one of a re-authentication request and a re-association request for transmission of the at least one of a re-authentication request and a re-association request in at least one OCT tunneling request frame by the other AP to the peer AP on a second frequency; and in response to transmission of the at least one MLME-OCTunnel.request primitive, decode at least one MLME-OCTunnel.request primitive comprising at least one of a re-authentication response and a re-association response from the other AP.

In Example 6, the subject matter of Examples 1-5 includes, wherein the processing circuitry is further configured to: in response to the STA being a multi-band capable device that is capable of simultaneous communication on different bands and a determination that the OCT procedure is available between the other AP and the peer AP, continue to decode data from the STA on the first frequency after tunneled Probe Request, Reauthentication and Reassociation frames have been communicated between the other AP and the peer AP via the OCT procedure and the STA is in communication with the peer AP using the second frequency.

In Example 7, the subject matter of Examples 1-6 includes, wherein: the OCT procedure, values of Band ID, Channel Number and BSSID fields in a Multi-band element of an OCT primitive are used to identify the NT-MLME.

In Example 8, the subject matter of Examples 1-7 includes, wherein: the other AP is co-located with the AP the processing circuitry comprises a Station Management Entity (SME) and a non-transmitting MLME (NT-MLME), the SME is configured to generate an OCT MLME request primitive that includes the Probe Request frame, a peer Multi-band element, and a local Multi-band element, and in response to reception of the OCT MLME request primitive, the NT-MLME is configured to: construct an OCT MAC Protocol Data Unit (MMPDU) corresponding to the OCT MLME request primitive, generate an MLME-OCTunnel-.request primitive with parameters including the OCT MMPDU, the Multi-band peer parameter set to the peer AP and a Multi-band Source parameter that identifies the NT-MLME, and send the MLME-OCTunnel.request primitive to a transmitting MLME (TR-MLME) of the other AP.

In Example 9, the subject matter of Example 8 includes, wherein: the NT-MLME is configured to, in response to transmission of the MLME-OCTunnel.request primitive, decode a MLME-OCTunnel.confirm primitive from the TR-MLME to indicate an outcome of transmission of the OCT tunneling request frame.

In Example 10, the subject matter of Examples 8-9 includes, wherein: the NT-MLME is further configured to, in response to transmission of the MLME-OCTunnel.request primitive, decode from the TR-MLME a MLME-OCTunnel.indication primitive from the TR-MLME comprising a Probe Response frame in response to the Probe Request frame.

In Example 11, the subject matter of Example 10 includes, wherein: the MLME-OCTunnel.indication primitive further comprises a Multi-band local parameter set to a Multi-band element identifying the TR-MLME, a Multi-band Source parameter set to the Multi-band Source field contained in the On-channel Tunnel Request frame and a Tunneled RXVECTOR parameter set to an RXVECTOR of the On-channel Tunnel Request frame.

In Example 12, the subject matter of Examples 10-11 includes, wherein: the NT-MLME is configured to, in response to reception of the OCTunnel.indication primitive, generate an OCT MLME response primitive that includes the Probe Response frame.

In Example 13, the subject matter of Examples 7-12 includes, wherein: the other AP is co-located with the AP, the processing circuitry comprises a Station Management Entity (SME) and a non-transmitting MLME (NT-MLME), and in response to reception of an OCT MLME request primitive to scan for APs, the NT-MLME is configured to generate a MLME-SCAN.request primitive for a TR-MLME to scan for APs, the MLME-SCAN.request primitive specifying a list of channels to examine when scanning for a BSS, the MLME-SCAN.request primitive comprising a Multi-band local parameter, a Multi-band peer parameter, and a ChannelList parameter, the ChannelList parameter specifying channels used by the TR-MLME and the Multi-band peer parameter containing channels to be scanned.

In Example 14, the subject matter of Example 13 includes, wherein: the NT-MLME is configured to decode, from the TR-MLME in response to transmission of the MLME-SCAN.request primitive to the TR-MLME, a MLME-SCAN.confirm primitive comprising a result code that is able to report that not all channels have been scanned as specified in the ChannelList parameter of the MLME-SCAN.request primitive.

In Example 15, the subject matter of Example 14 includes, wherein: the MLME-SCAN.confirm primitive further comprises a ScannedChannelList parameter that contains a list of scanned channels that is a subset of the channels present in the ChannelList parameter of the MLME-SCAN.request primitive.

In Example 16, the subject matter of Examples 1-15 includes, wherein: the first frequency is 2.4 GHz and the second frequency is 6 GHz.

Example 17 is an apparatus of an access point (AP), the apparatus comprising: processing circuitry configured to: decode an on-channel tunneling (OCT) request from a co-located AP, the OCT request comprising a Probe Request frame from a station (STA) to the co-located AP on a first frequency band, the Probe Request frame indicating a peer AP to transition to; in response to reception of the OCT request, generate an OCT request frame comprising the Probe Request frame for transmission to the peer AP on a second frequency band; decode an OCT response frame from the peer AP on the second frequency band in response to transmission of the OCT request frame, the OCT response frame comprising a Probe Response frame in response to the Probe Request frame; and in response to reception of the OCT response frame, generate an OCT response comprising the Probe Response frame for transmission by the co-located AP to the STA on the first frequency band; and a memory configured to store at least one of the Probe Request frame and Probe Response frame.

In Example 18, the subject matter of Example 17 includes, the processing circuitry further configured to: generate, for transmission to the peer AP on the second frequency band, at least one OCT tunneling request frame comprising at least one of a re-authentication request and a re-association request from the STA received by the co-located AP on the first frequency band; and in response to transmission of the at least one OCT tunneling request frame, decode, from the peer AP on the second frequency band for transmission to the STA by the co-located AP on the first frequency band, at least one of a re-authentication response and a re-association response in response to the at least one of the re-authentication request and the re-association request.

Example 19 is a non-transitory computer-readable storage medium that stores instructions for execution by processing circuitry to perform operations for communication by an access point (AP), the operations to configure the processing circuitry to: receive a Probe Request frame, indicating a peer AP, from a station (STA) on a first frequency band; transmit an on-channel tunneling (OCT) request to a co-located AP for transmission in an OCT request frame to the peer AP on a second frequency band, the OCT request and OCT request frame comprising the Probe Request frame; receive an OCT response from the co-located AP, the OCT response comprising a Probe Response frame in response to the Probe Request frame, the Probe Request frame received by the co-located AP from the peer AP on the second frequency band; and transmit the Probe Response frame to the STA on the first frequency band.

In Example 20, the subject matter of Example 19 includes, the operations to further configure the processing circuitry to: receive, from the STA on the first frequency band, at least one of a re-authentication request and a re-association request; send, for transmission by the co-located AP to the peer AP on the second frequency band, at least one OCT tunneling request comprising the at least one of a re-authentication request and a re-association request; receive, from the co-located AP, at least one of a re-authentication response and a re-association response in response to the at least one of the re-authentication request and the re-association request, the at least one of a re-authentication response and a re-association response received from the peer AP by the co-located AP on the second frequency band; and send the at least one of a re-authentication response and a re-association response to the STA on the first frequency band.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

It will thus be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point (AP), the apparatus comprising:
    processing circuitry comprising a Station Management Entity (SME) and a non-transmitting MLME (NT-MLME), the processing circuitry configured to:
        decode a Probe Request frame received from a station (STA) to transition to another basic service set (BSS), the probe request indicating a peer AP;
        determine that an On-Channel Tunnel (OCT) procedure is available between one of:
            the AP and the peer AP, or
            another AP and the peer AP, the other AP connected to the AP;
        in response to a determination that the OCT procedure is available between the AP and the peer AP, generate an OCT tunneling request frame comprising the Probe Request frame for transmission to the peer AP;
        in response to a determination that the OCT procedure is available between the other AP and the peer AP, generate a medium access control (MAC) Sublayer Management Entity (MLME)-OCTunnel.request primitive comprising the Probe Request frame for transmission of the Probe Request frame in the OCT tunneling request frame by the other AP to the peer AP;
        wherein the SME is configured to generate an OCT MLME request primitive that includes the Probe Request frame, a peer Multi-band element, and a local Multi-band element; and
        in response to reception of the OCT MLME request primitive, the NT-MLME is configured to:
            construct an OCT MAC Protocol Data Unit (MMPDU) corresponding to the OCT MLME request primitive,
            generate an MLME-OCTunnel.request primitive with parameters including the OCT MMPDU, the Multi-band peer parameter set to the peer AP and a Multi-band Source parameter that identifies the NT-MLME, and
            send the MLME-OCTunnel.request primitive to a transmitting MLME (TR-MLME) of the other AP; and
    a memory configured to store the Probe Request frame.

2. The apparatus according to claim 1, wherein the processing circuitry is further configured to:
    generate, for transmission to the STA, a BSS Transition Management (BTM) request, the BTM comprising a neighbor report describing the peer AP with a request to transition to the peer AP, the Probe Request frame received in response to transmission to the BTM request.

3. The apparatus according to claim 2, wherein the processing circuitry is further configured to:
    generate a beacon frame comprising a Reduced Neighbor Report (RNR) element and an OCT Recommended bit, the RNR element comprising the neighbor report, the OCT Recommended bit indicating that the OCT procedure is available between the one of the AP and the peer AP, or the other AP and the peer AP.

4. The apparatus according to claim 1, wherein the processing circuitry is further configured to:
in response to a determination that the OCT procedure is available between the AP and the peer AP, generate at least one OCT tunneling request frame containing at least one of a re-authentication request and a re-association request for transmission to the peer AP on a first frequency; and
in response to transmission of the at least one OCT tunneling request frame, decode at least one of a re-authentication response and a re-association response from the peer AP on a first frequency.

5. The apparatus according to claim 1, wherein the processing circuitry is further configured to:
in response to a determination that the OCT procedure is available between the other AP and the peer AP, generate at least one MLME-OCTunnel.request primitive comprising the at least one of a re-authentication request and a re-association request for transmission of the at least one of a re-authentication request and a re-association request in at least one OCT tunneling request frame by the other AP to the peer AP on a second frequency; and
in response to transmission of the at least one MLME-OCTunnel.request primitive, decode at least one MLME-OCTunnel.request primitive comprising at least one of a re-authentication response and a re-association response from the other AP.

6. The apparatus according to claim 1, wherein the processing circuitry is further configured to:
in response to the STA being a multi-band capable device that is capable of simultaneous communication on different bands and a determination that the OCT procedure is available between the other AP and the peer AP, continue to decode data from the STA on a first frequency after tunneled Probe Request, Reauthentication and Reassociation frames have been communicated between the other AP and the peer AP via the OCT procedure and the STA is in communication with the peer AP using a second frequency.

7. The apparatus according to claim 1, wherein:
the NT-MLME is configured to, in response to transmission of the MLME-OCTunnel.request primitive, decode a MLME-OCTunnel.confirm primitive from the TR-MLME to indicate an outcome of transmission of the OCT tunneling request frame.

8. The apparatus according to claim 1, wherein:
the NT-MLME is further configured to, in response to transmission of the MLME-OCTunnel.request primitive, decode from the TR-MLME a MLME-OCTunnel.indication primitive from the TR-MLME comprising a Probe Response frame in response to the Probe Request frame.

9. The apparatus according to claim 8, wherein:
the MLME-OCTunnel.indication primitive further comprises a Multi-band local parameter set to a Multi-band element identifying the TR-MLME, a Multi-band Source parameter set to a Multi-band Source field contained in the On-channel Tunnel Request frame and a Tunneled RXVECTOR parameter set to an RXVECTOR of the On-channel Tunnel Request frame.

10. The apparatus according to claim 8, wherein:
the NT-MLME is configured to, in response to reception of the OCTunnel.indication primitive, generate an OCT MLME response primitive that includes the Probe Response frame.

11. The apparatus according to claim 1, wherein:
in response to reception of an OCT MLME request primitive to scan for APs, the NT-MLME is configured to generate a MLME-SCAN.request primitive for a TR-MLME to scan for APs, the MLME-SCAN.request primitive specifying a list of channels to examine when scanning for a BSS, the MLME-SCAN.request primitive comprising a Multi-band local parameter, a Multi-band peer parameter, and a ChannelList parameter, the ChannelList parameter specifying channels used by the TR-MLME and the Multi-band peer parameter containing channels to be scanned.

12. The apparatus according to claim 11, wherein:
the NT-MLME is configured to decode, from the TR-MLME in response to transmission of the MLME-SCAN.request primitive to the TR-MLME, a MLME-SCAN.confirm primitive comprising a result code that is able to report that not all channels have been scanned as specified in the ChannelList parameter of the MLME-SCAN.request primitive.

13. The apparatus according to claim 12, wherein:
the MLME-SCAN.confirm primitive further comprises a ScannedChannelList parameter that contains a list of scanned channels that is a subset of the channels present in the ChannelList parameter of the MLME-SCAN.request primitive.

14. The apparatus according to claim 1, wherein:
the first frequency is 2.4 GHz and the second frequency is 6 GHz.

15. The apparatus according to claim 1, wherein:
the other AP is co-located with the AP,
the Probe Request frame is received on a first frequency,
the OCT tunneling request frame is configured for transmission to the peer AP on the first frequency, and
the OCT tunneling request frame is configured for transmission on a second frequency.

16. A non-transitory computer-readable storage medium that stores instructions for execution by processing circuitry, comprising a Station Management Entity (SME) and a non-transmitting MLME (NT-MLME), to perform operations for communication by an access point (AP), the operations to configure the processing circuitry to:
decode a Probe Request frame received from a station (STA) to transition to another basic service set (BSS), the probe request indicating a peer AP;
determine that an On-Channel Tunnel (OCT) procedure is available between one of:
the AP and the peer AP, or
another AP and the peer AP, the other AP connected to the AP;
in response to a determination that the OCT procedure is available between the AP and the peer AP, generate an OCT tunneling request frame comprising the Probe Request frame for transmission to the peer AP;
in response to a determination that the OCT procedure is available between the other AP and the peer AP, generate a medium access control (MAC) Sublayer Management Entity (MLME)-OCTunnel.request primitive comprising the Probe Request frame for transmission of the Probe Request frame in the OCT tunneling request frame by the other AP to the peer AP;

generate, by the SME, an OCT MLME request primitive that includes the Probe Request frame, a peer Multi-band element, and a local Multi-band element; and in response to reception of the OCT MLME request primitive, configure the NT-MLME to:

construct an OCT MAC Protocol Data Unit (MMPDU) corresponding to the OCT MLME request primitive, generate an MLME-OCTunnel.request primitive with parameters including the OCT MMPDU, the Multi-band peer parameter set to the peer AP and a Multi-band Source parameter identifying the NT-MLME, and send the MLME-OCTunnel.request primitive to a transmitting MLME (TR-MLME) of the other AP.

17. The non-transitory computer-readable storage medium according to claim 16, wherein the operations to further configure the NT-MLME to, in response to transmission of the MLME-OCTunnel.request primitive:

decode a MLME-OCTunnel.confirm primitive from the TR-MLME to indicate an outcome of transmission of the OCT tunneling request frame, and decode from the TR-MLME a MLME-OCTunnel.indication primitive from the TR-MLME comprising a Probe Response frame in response to the Probe Request frame.

18. The non-transitory computer-readable storage medium according to claim 17, wherein the MLME-OCTunnel.indication primitive further comprises a Multi-band local parameter set to a Multi-band element identifying the TR-MLME, a Multi-band Source parameter set to a Multi-band Source field contained in the On-channel Tunnel Request frame and a Tunneled RXVECTOR parameter set to an RXVECTOR of the On-channel Tunnel Request frame.

19. An apparatus of an access point (AP), the apparatus comprising:

processing circuitry comprising a Station Management Entity (SME) and a non-transmitting MLME (NT-MLME), the processing circuitry configured to:

decode a Probe Request frame received from a station (STA) to transition to another basic service set (BSS), the probe request indicating a peer AP;

generate, by the SME, an On-Channel Tunnel (OCT) MLME request primitive that includes the Probe Request frame, a peer Multi-band element, and a local Multi-band element; and in response to reception of the OCT MLME request primitive, configure the NT-MLME to:

construct an OCT medium access control (MAC) Protocol Data Unit (MMPDU) corresponding to the OCT MLME request primitive, generate an MLME-OCTunnel.request primitive with parameters including the OCT MMPDU, the Multi-band peer parameter set to the peer AP and a Multi-band Source parameter identifying the NT-MLME, and send the MLME-OCTunnel.request primitive to a transmitting MLME (TR-MLME) for transmission of an OCT tunneling request frame; and a memory configured to store the Probe Request frame.

20. The apparatus according to claim 19, wherein the NT-MLME is configured to, in response to transmission of the MLME-OCTunnel.request primitive:

decode a MLME-OCTunnel.confirm primitive from the TR-MLME to indicate an outcome of transmission of the OCT tunneling request frame, and decode from the TR-MLME a MLME-OCTunnel.indication primitive from the TR-MLME comprising a Probe Response frame in response to the Probe Request frame.

* * * * *